United States Patent
Jimenez Pino et al.

(10) Patent No.: US 11,502,613 B2
(45) Date of Patent: Nov. 15, 2022

(54) DC-DC CONVERTER THAT APPLIES A DUAL ACTIVE BRIDGE RECTIFIER TOPOLOGY

(71) Applicant: LEAR CORPORATION, Southfield, MI (US)

(72) Inventors: Rafael Jimenez Pino, Valls (ES); Pablo Gaona Rosanes, Valls (ES); Hector Sarnago Andia, Olvega (ES); Oscar Lucia Gil, Saragossa (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/386,944

(22) Filed: Jul. 28, 2021

(65) Prior Publication Data
US 2022/0060119 A1 Feb. 24, 2022

Related U.S. Application Data

(60) Provisional application No. 63/067,206, filed on Aug. 18, 2020.

(51) Int. Cl.
*H02M 3/335* (2006.01)
*H02M 1/00* (2006.01)
(Continued)

(52) U.S. Cl.
CPC ......... *H02M 3/33584* (2013.01); *B60L 53/20* (2019.02); *H02M 1/0048* (2021.05);
(Continued)

(58) Field of Classification Search
CPC .......... H02M 3/33584; H02M 1/0048; H02M 3/33571; H02M 3/33592; H02M 3/3376; H02M 1/0064; H02M 3/01; H02M 3/33573; H02M 3/33576; B60L 53/20; B60L 2210/10; B60L 2210/30
See application file for complete search history.

(56) References Cited

U.S. PATENT DOCUMENTS

| | | | |
|---|---|---|---|
| 5,539,630 A | * | 7/1996 | Pietkiewicz ........ H02M 3/3372 363/17 |
| 5,673,183 A | | 9/1997 | Milavec et al. |

(Continued)

*Primary Examiner* — Yusef A Ahmed
(74) *Attorney, Agent, or Firm* — Brooks Kushman P.C.

(57) ABSTRACT

A bidirectional or unidirectional DC-DC converter includes a primary stage and a secondary stage. The primary stage is configured to receive or output a first DC voltage. The primary stage includes a first switching network configured to convert the first DC voltage to a first alternating current (AC) voltage or vice versa. The DC-DC converter also includes a transformer having primary windings and secondary windings. The primary windings are in electrical communication with the first switching network. The transformer is configured to convert between the first AC voltage and a second AC voltage. The DC-DC converter also includes a secondary stage that has a second switching network. Characteristically, the second switching network and the transformer operate as an interleaved converter to convert the second AC voltage to an output DC voltage or vice versa. Advantageously, the required series inductance for this interleaved converter is integrated into the transformer.

15 Claims, 11 Drawing Sheets

(51) Int. Cl.
    *B60L 53/20*     (2019.01)
    *H02M 3/00*     (2006.01)
    *H02M 3/337*     (2006.01)

(52) U.S. Cl.
    CPC ........... *H02M 1/0064* (2021.05); *H02M 3/01* (2021.05); *H02M 3/33571* (2021.05); *H02M 3/33573* (2021.05); *H02M 3/33576* (2013.01); *H02M 3/33592* (2013.01); *B60L 2210/10* (2013.01); *B60L 2210/30* (2013.01); *H02M 3/3376* (2013.01)

(56) References Cited

U.S. PATENT DOCUMENTS

| | | | |
|---|---|---|---|
| 6,370,050 B1* | 4/2002 | Peng | H02M 7/4807 363/17 |
| 7,505,289 B2 | 3/2009 | Kim et al. | |
| 7,859,870 B1* | 12/2010 | Schutten | H02M 3/337 363/56.02 |
| 8,035,996 B1* | 10/2011 | Greenfeld | H02M 3/3376 363/17 |
| 10,483,862 B1* | 11/2019 | Cook | H02M 1/088 |
| 2006/0103359 A1* | 5/2006 | Watanabe | H02M 3/1584 323/225 |
| 2011/0090717 A1* | 4/2011 | Lee | H02M 3/33584 363/21.02 |
| 2012/0044722 A1* | 2/2012 | Cuk | H02M 3/335 363/21.03 |
| 2012/0281436 A1* | 11/2012 | Cuk | H02M 3/33569 363/21.03 |
| 2013/0141199 A1* | 6/2013 | Hayes | H01F 30/12 336/5 |
| 2014/0247625 A1* | 9/2014 | Hosotani | H02M 3/33569 363/21.02 |
| 2015/0055374 A1* | 2/2015 | Yamashita | H02M 3/337 363/17 |
| 2015/0131339 A1 | 5/2015 | Furukawa | |
| 2015/0381060 A1* | 12/2015 | Eng | H02M 3/3376 363/21.03 |
| 2017/0070163 A1* | 3/2017 | Pahlevaninezhad | H02M 1/126 |
| 2017/0141689 A1* | 5/2017 | Hatano | H02M 3/33546 |
| 2018/0198380 A1* | 7/2018 | Sterna | H02M 7/219 |
| 2019/0061553 A1* | 2/2019 | Yang | B60L 58/22 |
| 2019/0199225 A1* | 6/2019 | Futrell | H02M 1/088 |
| 2019/0319541 A1* | 10/2019 | Murakami | H02M 3/33507 |
| 2020/0036284 A1* | 1/2020 | Qin | H03B 5/1212 |
| 2020/0044573 A1* | 2/2020 | Kusama | H02M 3/3353 |
| 2020/0144926 A1* | 5/2020 | Murakami | H02M 3/33576 |
| 2020/0389095 A1* | 12/2020 | Kajiyama | H02M 3/156 |
| 2020/0395839 A1* | 12/2020 | Ayyanar | H02M 1/4208 |
| 2021/0099096 A1* | 4/2021 | Escudero Rodriguez | B60L 58/20 |
| 2021/0143665 A1* | 5/2021 | Jimenez Pino | H02J 7/02 |
| 2021/0159799 A1* | 5/2021 | Suzuki | H02M 3/1584 |
| 2021/0175809 A1* | 6/2021 | Nakahara | H02M 3/33584 |
| 2021/0203237 A1* | 7/2021 | Hang | H02M 3/33584 |
| 2021/0249962 A1* | 8/2021 | Watanabe | H02M 3/33576 |
| 2021/0273552 A1* | 9/2021 | Tian | H02M 1/126 |
| 2021/0351712 A1* | 11/2021 | Landseadel | H02M 3/33584 |
| 2021/0375523 A1* | 12/2021 | Ishizuka | H02M 1/0064 |
| 2021/0376741 A1* | 12/2021 | Escudero Rodriguez | H02M 3/33584 |
| 2022/0014106 A1* | 1/2022 | Askarianabayaneh | H02M 3/33584 |

* cited by examiner

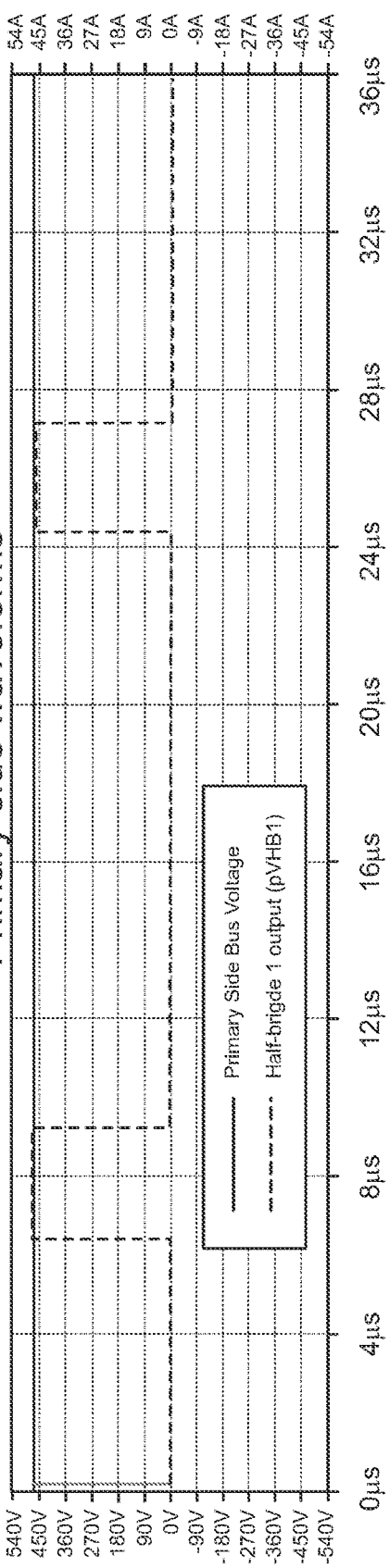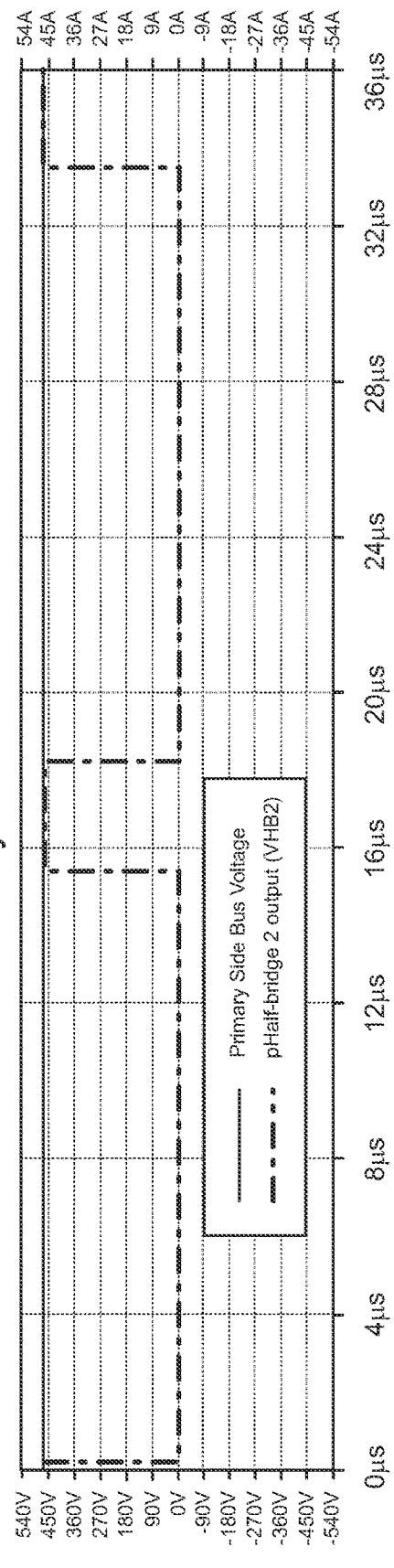
Fig. 4A
Fig. 4B

DC-DC CONVERTER THAT APPLIES A DUAL ACTIVE BRIDGE RECTIFIER TOPOLOGY

CROSS-REFERENCE TO RELATED APPLICATIONS

This application claims the benefit of U.S. provisional application Ser. No. 63/067,206 filed Aug. 18, 2020, the disclosure of which is hereby incorporated in its entirety by reference herein.

TECHNICAL FIELD

In at least one aspect, a method and device for DC to DC conversion in an electric or hybrid electric vehicle is provided.

BACKGROUND

DC-DC power converters are nowadays implemented most commonly using LLC structures, as shown in FIG. 1. This structure requires a resonant tank composed of $L_r$ and $C_r$, and an isolation transformer, usually with a step-down conversion in these applications. This fact makes this implementation expensive because of the need for two magnetic elements and challenging to tune due to the influence of changes in the resonant tank in the final converter operation.

In order to solve these issues, the dual active bridge topology has been proposed to alleviate the main drawbacks of the LLC implementation (FIG. 2A). In an advantageous implementation, the required series inductance can be integrated into the transformer, leading to the use of a single magnetic component. A series capacitor, like Cr but smaller, could be used to further avoid any current DC component reaching the transformer, although normally DC current is forced to zero by control One of the main challenges of such converters is the need to provide high output currents. This typically makes designing the transformer secondary stage a challenging task. To achieve appropriate designs, typically, multiple rectifier implementations (FIG. 2B) are used in order to obtain the required output current. This, however, leads to increased cost due to additional power, driving and control devices, and additional control complexity.

Accordingly, there is a need for improved high to low voltage DCDC converters with reduced currents generated on the low voltage stage.

SUMMARY

In at least one aspect, a bidirectional or unidirectional DC-DC converter that applies a dual active bridge rectifier topology is provided. The bidirectional or unidirectional DC-DC converter converts an input DC voltage to an output DC voltage. The bidirectional or unidirectional DC-DC converter includes a first switching network and a second switching network. The first switching network receives or outputs a first DC voltage and a first AC voltage. The first switching network is configured to receive the first DC voltage and to convert the first DC voltage to the first AC voltage or to convert the first AC voltage to the first DC voltage and to output the first DC voltage. The second switching network operates from a secondary side bus voltage. The bidirectional or unidirectional DC-DC converter also includes a transformer having primary windings and secondary windings. The transformer is configured to receive the first AC voltage and output a second AC voltage or to receive the second AC voltage and output the first AC voltage. The secondary windings include a first end terminal, a second end terminal, and an output terminal positioned between the first end terminal and the second end terminal. The primary windings are in electrical communication with the first switching network, while the secondary windings are in electrical communication with the second switching network. The second switching network is connected across the first end terminal and the second end terminal of the secondary windings. The secondary windings and the second switching network are configured convert the second AC voltage to a second DC voltage or to convert the second DC voltage to the second AC voltage. The first switching network and the second switching network are operated such that a first current flows between the first end terminal and the output terminal of the secondary windings, a second current flows between the second end terminal and the output terminal of the secondary windings, and a third current flows through the primary windings. Characteristically, the first current, the second current, and third current are at least partially established by mutual inductance between the primary windings and the secondary windings such that when the first DC voltage is the input DC voltage, the second DC voltage is the output DC voltage and when the second DC voltage is the input DC voltage, the second DC voltage is the output DC voltage.

In another aspect, a 400/12V DCDC converter has the secondary side of the transformer divided in two (with a middle point). This design enables doubling the working voltage at the secondary switching stages, thus reducing by half the current through the components therein. The design also enables using lower-cost switches, or less of them (in case of paralleling), leading to cost reduction.

In another aspect, a DCDC converter that obviates a low voltage 1 (e.g., 12V) filter component is provided. The filter component may be eliminated due to the functional improvement available in this new configuration.

In still another aspect, a DCDC converter that obviates the need for a choke on the secondary side DC output is provided. Instead, the inductance of the transformer's secondary side is used to provide the DC output.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGS. 4A, 4B, and 4C. Primary side waveforms for a converter that receives an input DC voltage on the primary side while outputting an output DC voltage on the secondary side: Primary side bus voltage, half-bridge 1 output voltage ("pVHB1") and, half-bridge 2 output voltage ("pVHB2"), full-bridge output voltage bridge output voltage (pVHB1-pVHB2), and current through the transformer primary ($I(L_3)$).

DETAILED DESCRIPTION

Figure 1:
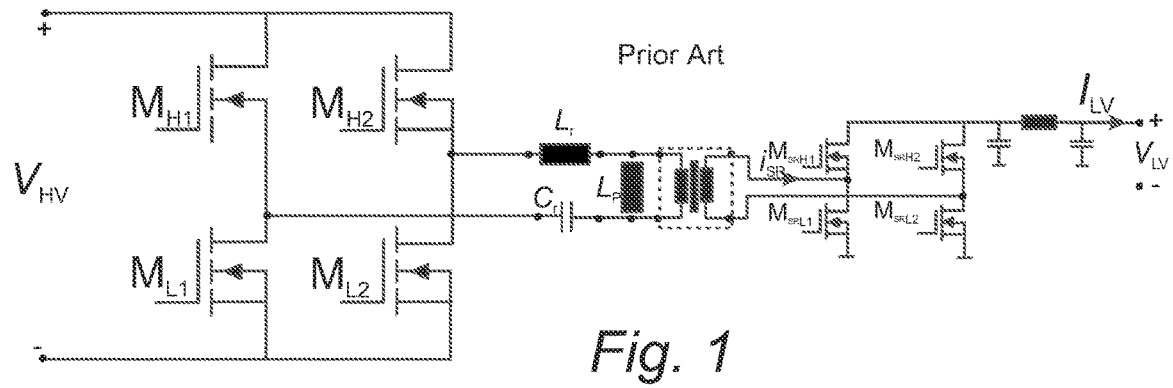
FIG. 1. Schematic diagram of a prior art DC-DC converter.
Figure 2A:
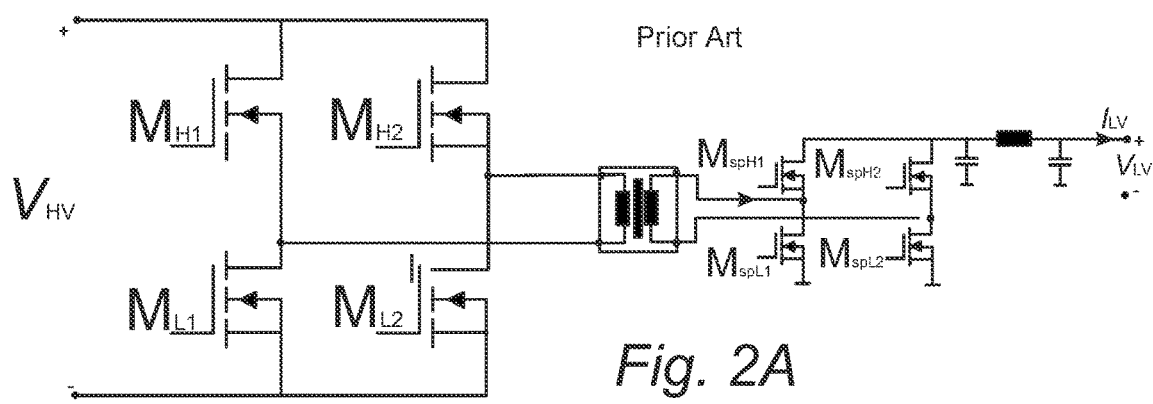
FIG. 2A. Schematic diagram of a prior art DC-DC converter.
Figure 2B:
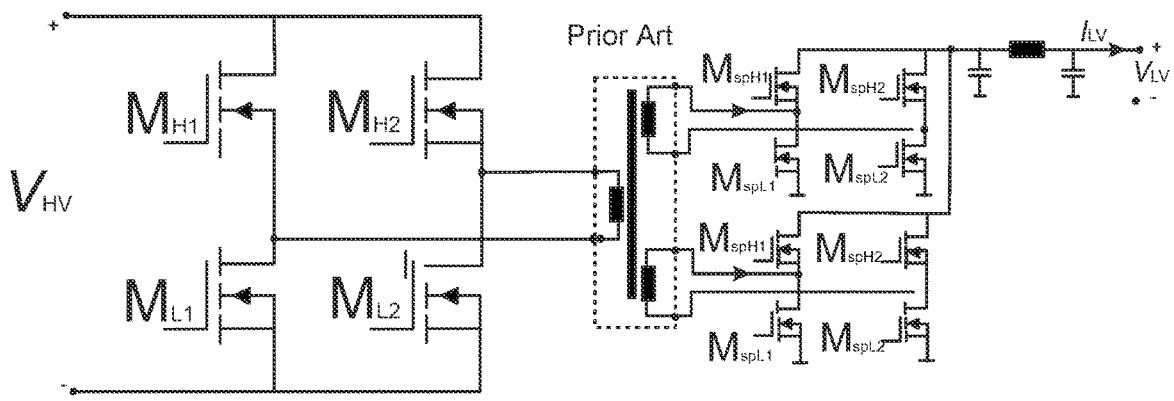
FIG. 2B. Schematic diagram of a prior art DC-DC converter.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be a stationary signal or it can vary with respect to time.

The terms "DC signal" or "DC voltage" refer to electrical signals or electrical voltage that have voltage values that are always over 0 volts.

The terms "AC signal" or "AC voltage" refer to electrical signals or electrical voltage that have voltages varying between positive and negative voltages and crossing 0 volts The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Abbreviations:

"AC" means alternating current.

"DAB" means dual active bridge.

"DC" means direct current.

Figure 3:
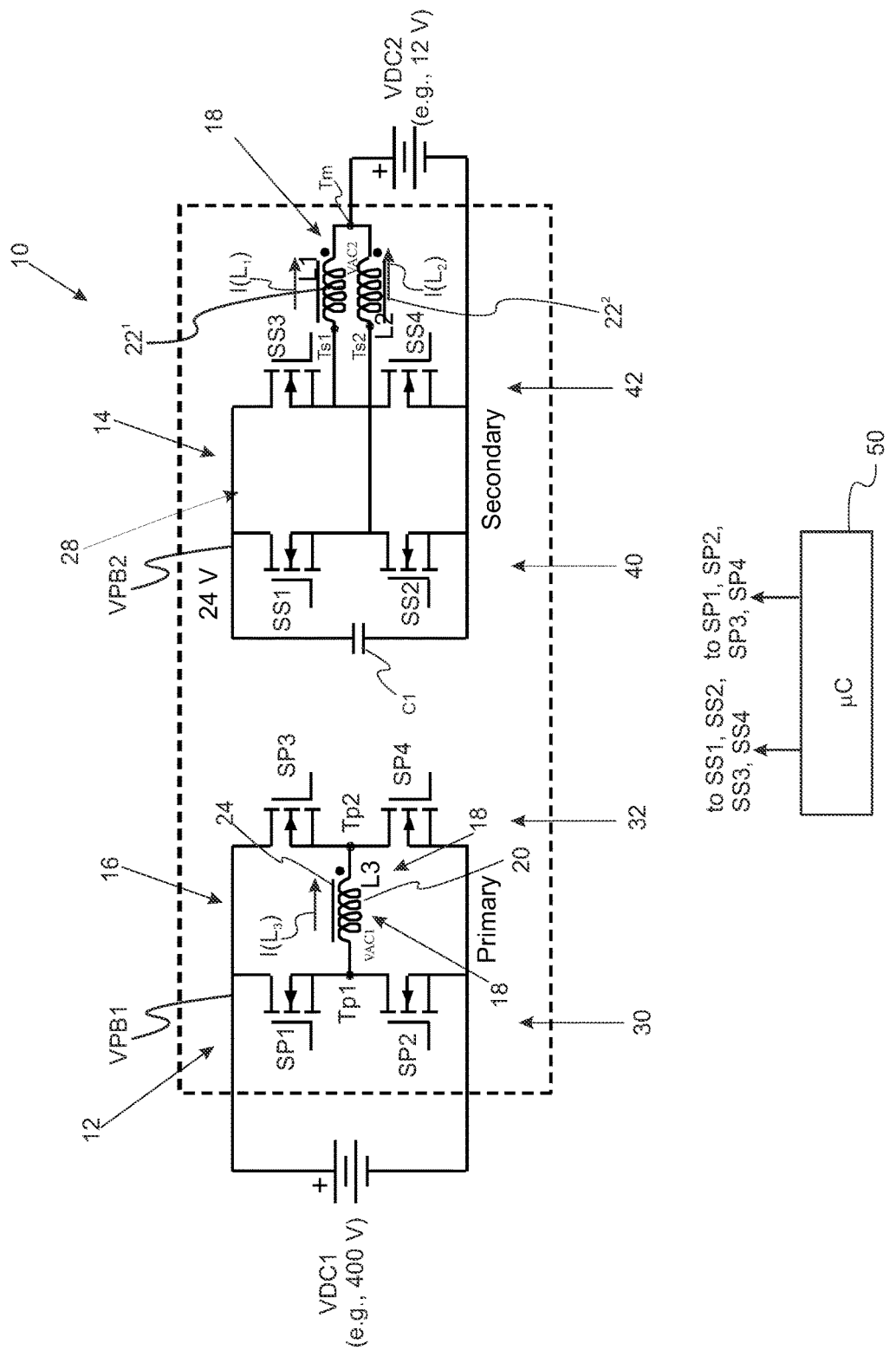
FIG. 3. Schematic of an inventive design of a bidirectional or unidirectional DC-DC converter.

Referring now to FIG. 3, a schematic of a bidirectional or unidirectional direct current/direct current (DC/DC) converter system is provided. Bidirectional or unidirectional DC/DC converter system 10 applies a dual active bridge rectifier topology that converts an input DC voltage to an output DC voltage. In a variation, DC/DC converter system 10 includes a primary stage 12 and a secondary stage 14. In this context, primary stage 12 and secondary stage 14 can also be referred to as primary side 12 and secondary side 14. The primary stage 12 is configured to receive (or output) a first DC voltage VDC1 while the secondary stage is configured to output (or receive) a second DC voltage VDC2. In a variation, a first switching network 16 receives or outputs the first DC voltage and the first AC voltage VAC1. In one refinement, when the primary stage receives the input DC voltage (as first DC voltage VDC1), the secondary stage outputs the output DC voltage (as second DC voltage VDC2), with the first switching network 16 being configured to receive the input DC voltage and to convert the first DC voltage to the first AC voltage VAC1. In another refinement, when the secondary stage receives the input DC voltage (as second DC voltage VDC2), the primary stage outputs the output DC voltage (as first DC voltage VDC1), with the first switching network 16 is configured to convert the first AC voltage VAC1 to the first DC voltage and to output the first DC voltage. In one refinement, the output DC voltage is less than the input DC voltage. In another refinement, the output DC voltage is greater than the input DC voltage.

DC/DC converter system 10 also includes a transformer 18 having primary windings 20 and secondary windings divided into first winding portion 22$^1$ and second winding portion 22$^2$. In a refinement, the primary windings are part of the primary stage and the secondary windings are part of the secondary stage. I(L$_1$) and I(L$_2$) refers to the current thought first winding portion 22$^1$ and second winding portion 22$^2$ with L$_1$ and L$_2$ representing the inductances thereof. I(L$_3$) refers to the current thought primary windings 20 with L$_3$ representing the inductance thereof. Transformer 18 also includes core 24, and in particular a magnetic core. The first current I(L$_1$) and the second current I(L$_2$) combine to form an output DC current that provides the output DC voltage. In a refinement, the first current is approximately equal to the second current multiplied by −1 plus an offset value. The core 24 can provide electrical separation of the primary stage 12 from the secondary stage 14. The primary windings are in electrical communication with the first switching network 16, while the secondary windings are in electrical communication with the second switching network 28. In a refinement when the primary stage receives the input DC voltage and the secondary stage outputs the output DC voltage, transformer 18 is configured to convert the first AC voltage VAC1 to a second AC voltage VAC2. In another refinement, when the secondary stage receives the input DC voltage and the primary stage outputs the output DC voltage, transformer 18 is configured to convert a second AC voltage VAC2 to the first AC voltage VAC1. In a refinement, the second AC voltage is from about 30 volts to 60 volts peak to peak. In a further refinement, the second AC voltage is about 48 volts peak to peak.

The second switching network 28 is connected across the secondary windings (i.e., across the combination of first winding portion 22$^1$ and second winding portion 22$^2$) by connection to terminal Ts1 and terminal Ts2. Secondary windings 22 refers to the in-series combination of first winding portion 22$^1$ and second winding portion 22$^2$. In a refinement when the primary stage receives the input DC voltage (as first DC voltage VDC1), the secondary stage 14 outputs the output DC voltage (as second DC voltage VDC2) with the secondary windings 22 and the second switching network 28 in combination being configured to convert the second AC voltage VAC2 to a second DC voltage VDC2. In another refinement, when the secondary stage 14 receives the input DC voltage (as second DC voltage VDC2), the primary stage 12 outputs the output DC voltage (as first DC voltage VDC1) with the primary windings 20 and the first switching network 16 in combination being configured to convert the first AC voltage to the first DC voltage.

Advantageously, the first switching network 16 and the second switching network 28 are operated such that a first current flows I(L1) between the first end terminal and the output terminal of the secondary windings, a second current I(L2) flows between the second end terminal and the output terminal of the secondary windings, and a third current flows I(L3) through the primary windings. Characteristically, the first current I(L1), the second current I(L2), and third current I(L3) are at least partially established by mutual inductance between the primary windings 20 and the secondary windings 22 such that when the first DC voltage is the input DC voltage, the second DC voltage is the output DC voltage and when the second DC voltage is the input DC voltage, the first DC voltage is the output DC voltage. It should be appreciated that the second DC voltage VDC2 is outputted from or inputted to terminal Tm in the secondary windings positioned between terminals Ts1 and Ts2.

It should also be appreciated that the same magnetic component in transformer 18 is used to perform both the isolation transformer function at the DAB structure and the series inductance at the buck structure. Moreover, the power devices at the secondary side perform two tasks: secondary-side of the DAB converter and interleaved converter. This provides a cost-effective implementation.

Still referring to FIG. 3, the first switching network 16 can include a first H-bridge circuit. Therefore, the first switching network 16 includes switches SP1, SP2, SP3, and SP4. First switching network 16 includes a first H-bridge arm 30 and a second H-bridge arm 32. In the first H-bridge arm 30, the source of transistor switch SP1 is connected to a first input terminal Tp1 of primary windings 20 of transformer 18. The drain of transistor switch SP1 is connected to the positive side of the primary side voltage bus VPB1, which is in electrical communication with the positive side of DC input voltage VDCin. The source of transistor switch SP1 is also connected to the drain of transistor switch SP2. Therefore, both the source of transistor switch SP1 and the drain of transistor switch SP2 are connected to the first input terminal Tp1 of primary windings 20. The source of transistor switch SP2 is in electrical communication with the negative side of primary side voltage bus VPB1 and therefore, the negative side of DC input voltage DCVin. Similarly, in the second H-bridge arm 32, the source of transistor switch SP3 is connected to a second input terminal Tp2 of primary windings 20. The drain of transistor switch SP3 is connected to the positive side of primary side voltage bus VPB1. The source of transistor switch SP3 is also connected to the drain of transistor switch SP4. Therefore, both the source of transistor switch SP3 and drain of transistor switch SP4 are connected to the second input terminal Tp2 of primary windings 20. The source of transistor switch SP4 is in electrical communication with the negative side of primary side voltage bus VPB1. During operation when the primary stage receives the DC input (as first DC voltage VDC1), first switching network 16 establishes the first AC voltage VAC1 that is applied to transformer 18 by creating positive and negative voltages that are alternatively applied to the transformer. When the secondary stage 14 receives the DC input (as second DC voltage VDC2), first switching network 16 converts the first AC voltage VAC1 to the first DC voltage VDC1 which is now the output of the converter.

Still referring to FIG. 3, the second switching network 28 can include a second H-bridge circuit. Therefore, second switching network 28 includes switches SS1, SS2, SS3, and SS4. Second switching network 28 includes a first H-bridge arm 40 and a second H-bridge arm 42. In the first H-bridge arm 40, the source of transistor switch SS1 is connected to a first input terminal Ts1 of secondary windings 22 of the transformer 18. The drain of transistor switch SS1 is connected to the positive side of secondary side voltage bus VPB2, which is in electrical communication with the positive side of capacitor C1. The source of transistor switch SS1 is also connected to the drain of transistor switch SS2. Therefore, both the source of transistor switch SS1 and the drain of transistor switch SS2 are connected to the second input terminal Ts2 of the secondary windings 22. The source of transistor switch SS2 is in electrical communication with the negative side of secondary side voltage bus VPB2 and therefore, with the negative side of capacitor C1. Similarly, in the second H-bridge arm 42, the source of transistor switch SS3 is connected to a first input terminal Ts1 of secondary windings 22. The drain of transistor switch SS3 is connected to the positive side of the secondary side voltage bus VPB2 which is in electrical communication with the positive side of capacitor C1. The source of transistor switch S3 is also connected to the drain of transistor switch SS4. Therefore, both the source of transistor switch SS3 is also connected to the drain of transistor switch SS4 are connected to the second input terminal Ts2 of transformer 20. The source of transistor switch SS4 is in electrical communication with the negative side of the secondary side voltage bus VPB2 which is in electrical communication with the negative side of capacitor C1. During operation when the primary stage receives the input DC voltage (as first DC voltage VDC1), second switching network 28 allows the same voltage polarity to be provided to output terminal Tm of the transformer 18 during the positive portion and negative portion of each cycle of second AC voltage. When the secondary stage 14 receives the input DC voltage (as second DC voltage VDC2), second switching network 28 is switched to create the second AC voltage that is applied to transformer 18. Therefore, transistors SS1 and SS2 form a first secondary side H-bridge while transistors SS3 and SS4 form a second secondary side H-bridge on the secondary stage. For example, when the voltage at terminal Ts1 is positive with respect to terminal Ts2, switches SS1 and SS4 are actuated (i.e., turned on) while switches SS2 and SS3 are open (i.e., turned off, nonconducting). When the voltage at terminal Ts2 is positive with respect to terminal Ts1, switch SS2 and SS3 are actuated (i.e., turned on or closed) while switches SS1 and SS4 are open (i.e., turned off).

In a variation, the secondary stage operates to reduce the output voltage at the secondary bus to obtain the required output DC voltage. In a refinement, the output DC voltage is half of the secondary bus voltage. In a typical 400-12 DC-DC converter implementation, the secondary bus voltage is 24 V, and the supplied output voltage is 12 V. This conversion stage provides the key benefit of reducing the current through the power devices due to the increased bus voltage. Therefore, the output current capability is greatly enhanced.

In a variation, converter 10 further includes a microcontroller 50 configured to control the transistor switches in the first switching network 16 and the second switching network 28. In a refinement, microcontroller 50 can send control signals to the gates of transistor switches SP1, SP2, SP3, and SP4. In this regard, transistor switches SP1 and SP4 form a first pair that is activated together and are simultaneous turned on and off by the control signal. Similarly, transistor switches SP2 and SP3 form a second pair that is active together and are simultaneously turned on and off by the control signals. The first pair of transistor switches SP1 and SP4 are alternatingly actuated by the control signals. Therefore, the control signal for the first pair of transistor switches SP1 and SP4 is (typically) 180° out of phase (typically 180°) with the second pair of transistor switches SP2 and SP2. The output being the same signal, over L3 where to a first H-Bridge arms includes transistor switches SS1 and SS2, and a second H-Bridge arm includes transistor switches SS3 and SS4. with the respective middle-point voltages at first input terminal TP1 and at second input terminal TP2 are out of phase. Finally, the H-Bridge output will be the difference of voltage at TP1 and the voltage at TP2.

Microcontroller 50 can also send control signals to the gates of transistor switches SS1, SS2, SS3, and SS4. In this regard, transistor switches SS1 and SS4 form a first that is activated together and are simultaneously turned on and off by the control signal. Similarly, transistor switches SS2, and SS3 form a second pair that is activated together and are simultaneously turned on and off by the control signals. The first pair of transistor switches SP1 and SP4 and the second pair of transistor switches SP2 and SP3 are alternatingly actuated by the control signals. Therefore, the control signal for the first pair of transistor switches SP1 and SP4 is (typically 180°) out of phase (typically 180°) with the second pair of transistor switches SP2 and SP3. Although the present invention is not limited by the type and frequency of the control signal, frequencies of about 20 to 120 kHZ can be used. The control signals can be square waves or any other suitable waveform.

Figure 4C:
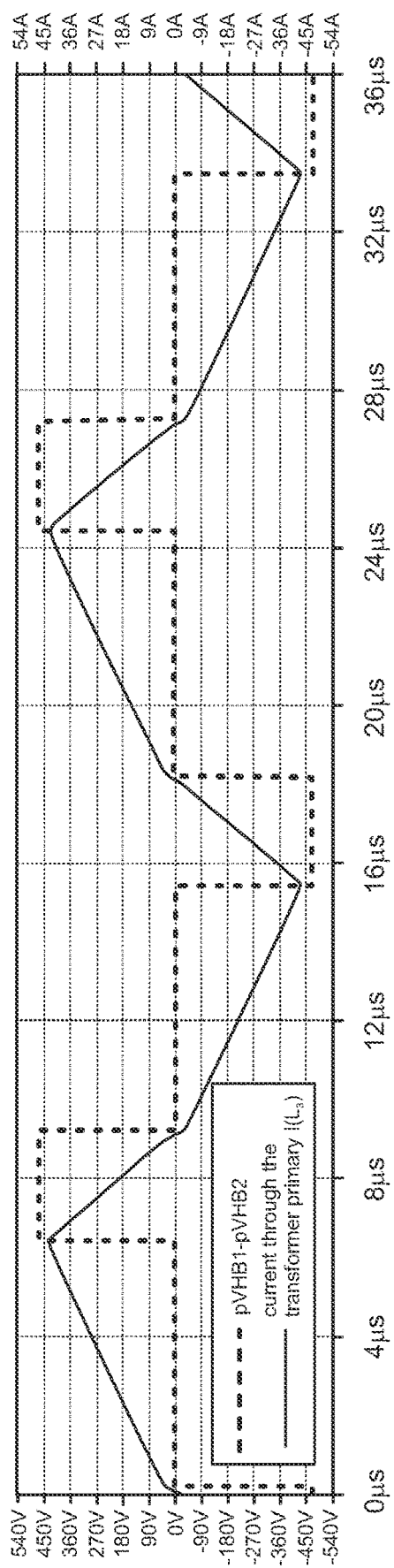
Figure 5A:
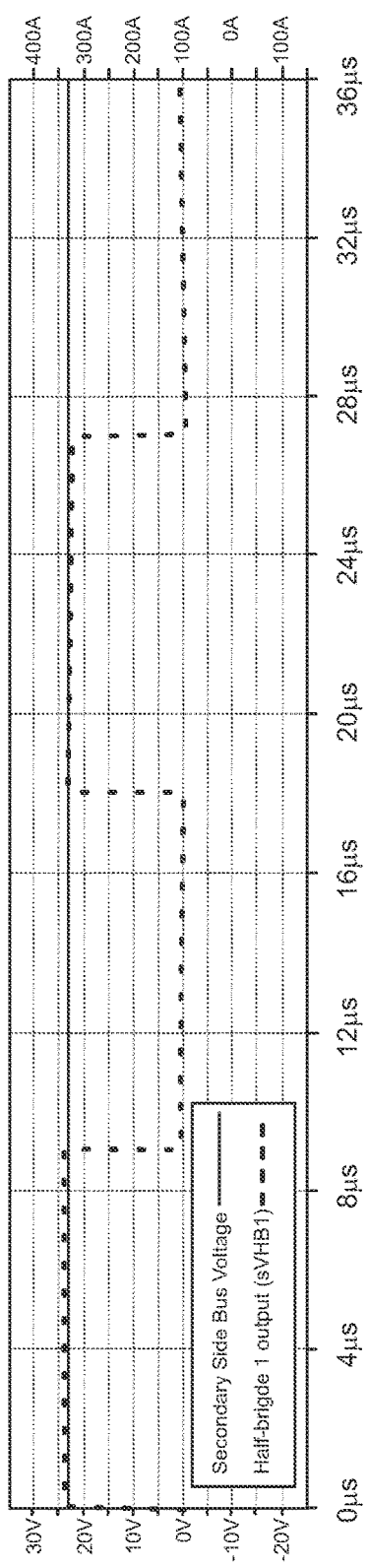
FIGS. 5A, 5B, 5C, and 5D. Secondary side waveforms for a converter that receives an input DC voltage on the primary side while outputting an output DC voltage on the secondary side: Secondary side bus voltage, half-bridge 1 output voltage ("sVHB1") and half-bridge 2 output voltage ("sVHB2"), full-bridge output voltage (sVHB1-sVHB2), and current through the transformer secondaries ($I(L_1)$ and $I(L_2)$) in FIG. 3).
Figure 5B:
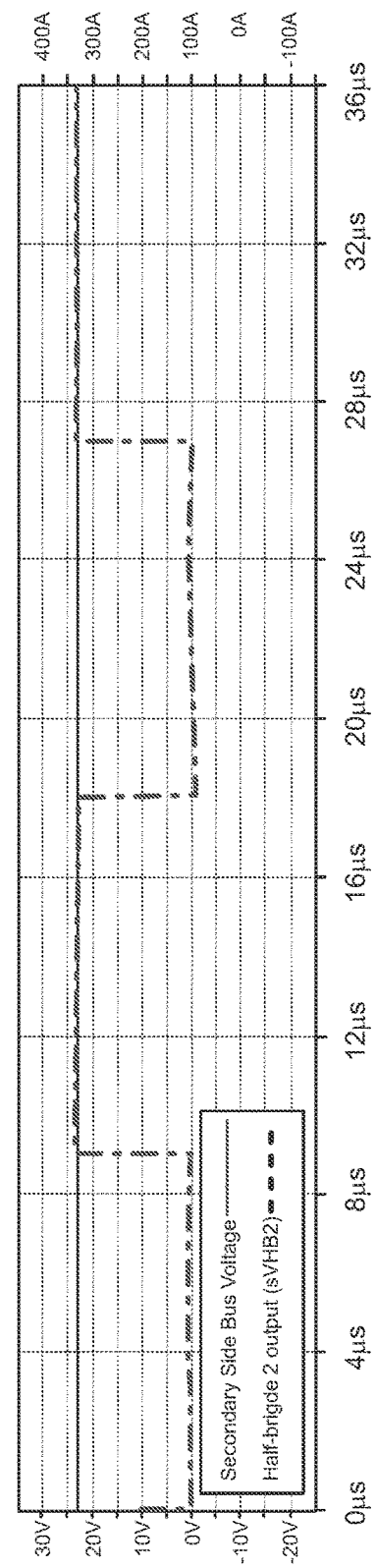
Figure 5C:
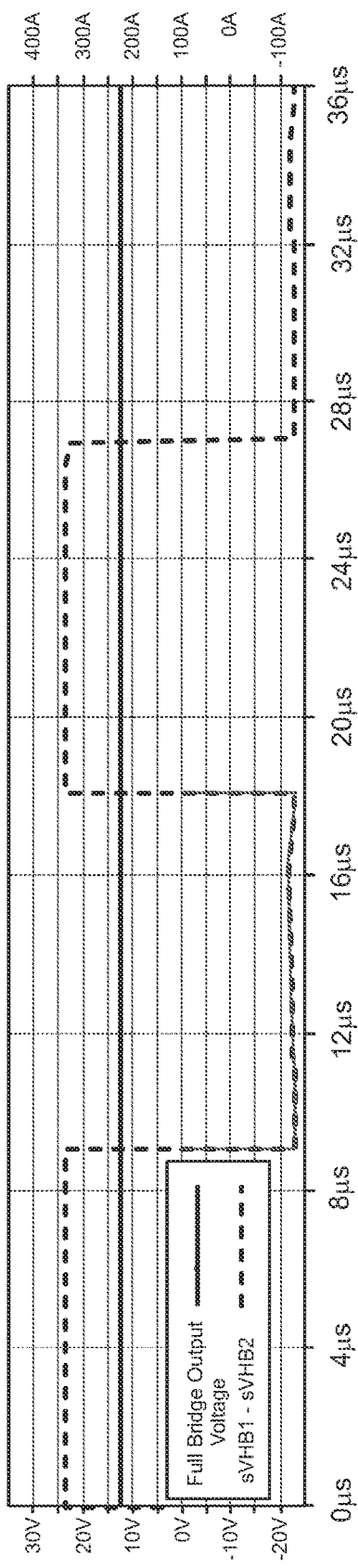
Figure 5D:
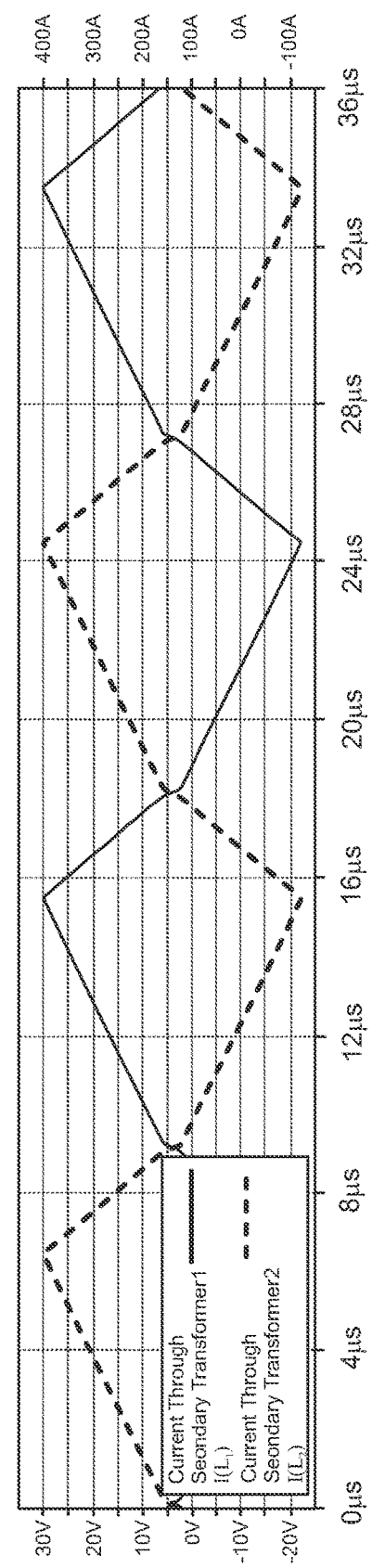
Figure 6:
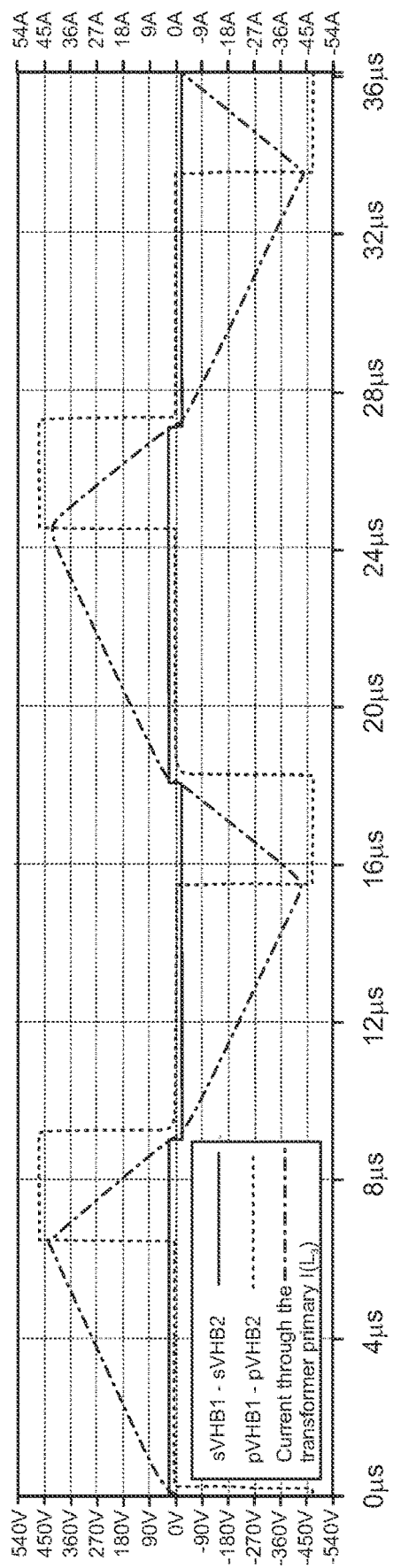
FIG. 6. Detail of the primary side output voltage (pVHB1-pVHB2), secondary-side output voltage (sVHB1-sVHB2), and current through the transformer primary ($I(L_3)$) for a converter that receives an input DC voltage on the primary side while outputting an output DC voltage on the secondary side.

Referring to FIGS. 4 to 6, waveforms for the converter of FIG. 3 are provided in which the primary stage 12 receives the input DC voltage and the secondary stage 14 outputs an output DC voltage. In particular, the input DC voltage can be a high voltage DC input (e.g., about 360 volts to 920 volts or about 170 volts to 470 volts) while the output DC voltage can be a low voltage DC output (8 volts to 16 volts or 24 to 58 volts). In this variation, first switching network 16 operates on the input DC voltage (i.e., first DC voltage VDC1) to form the first AC voltage VAC1 which is applied to transformer 18. The transformer converts the first AC voltage VAC1 to the second AC voltage VAC2. The secondary windings of transformer 18 and the second switching network are configured convert the second AC voltage to a second DC voltage with currents at least partially established by mutual inductance as set forth above. FIG. 4A provides plots of the primary side bus voltage and the half-bridge 1 output voltage ("pVHB1"). FIG. 4B provides plots of the primary side bus voltage and the primary half-bridge 2 output voltage ("pVHB2"). FIG. 4C provides plots of the primary side full-bridge output voltage (pVHB1-pVHB2) and current through the transformer primary (I(L$_3$)). FIG. 5A provides plots of the secondary side bus voltage and half-bridge 1 output voltage ("sVHB1"). FIG. 5B provides plots of the secondary side bus voltage and half-bridge 2 output voltage ("sVHB2"). FIG. 5C provides plots of the full bridge output voltage and the secondary side full-bridge output voltage (sVHB1-sVHB2), and FIG. 5D provides the current through the transformer secondaries (I(L$_1$) and I(L$_2$) in FIG. 3. FIG. 6 provides plots of the primary side output voltage (pVHB1-pVHB2), secondary side H-bridge output voltage, and current through the transformer primary (I(L$_3$)).

Figure 7A:
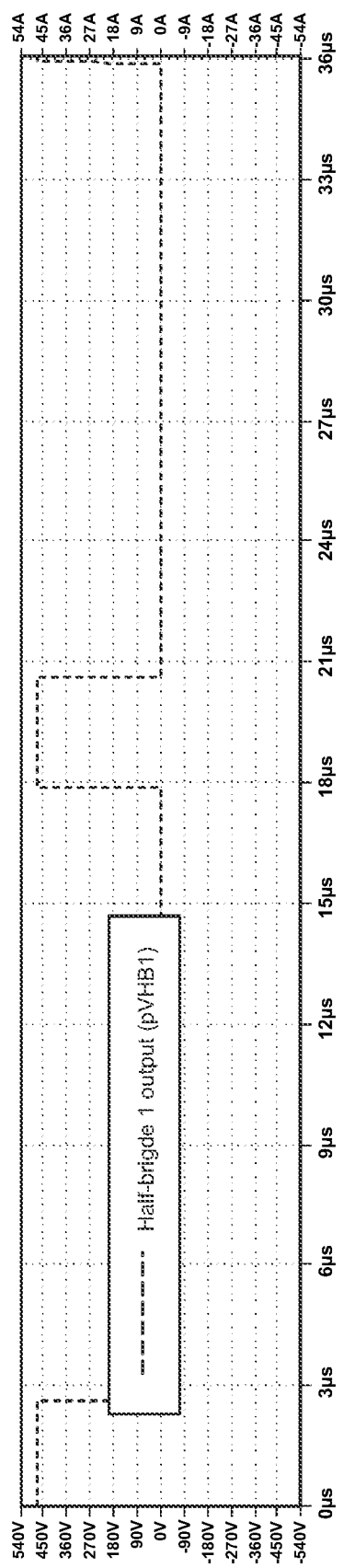
FIGS. 7A, 7B, and 7C. Primary side waveforms for a converter that receives an input DC voltage on the secondary side while outputting an output DC voltage on the primary side: Primary side bus voltage, half-bridge 1 output voltage ("pVHB1") and, half-bridge 2 output voltage ("pVHB2"), full-bridge output voltage bridge output voltage (pVHB1-pVHB2), and current through the transformer primary ($I(L_3)$).
Figure 7B:
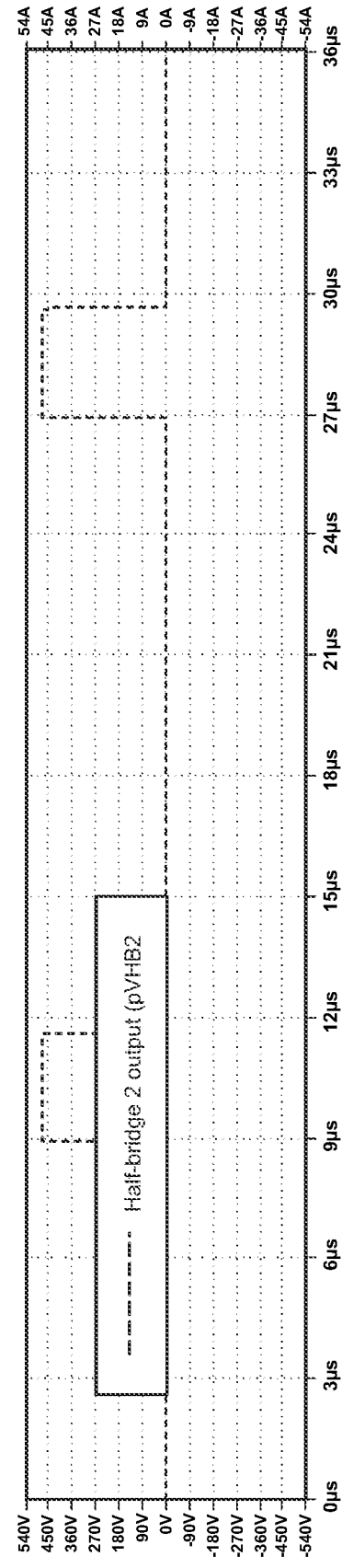
Figure 7C:
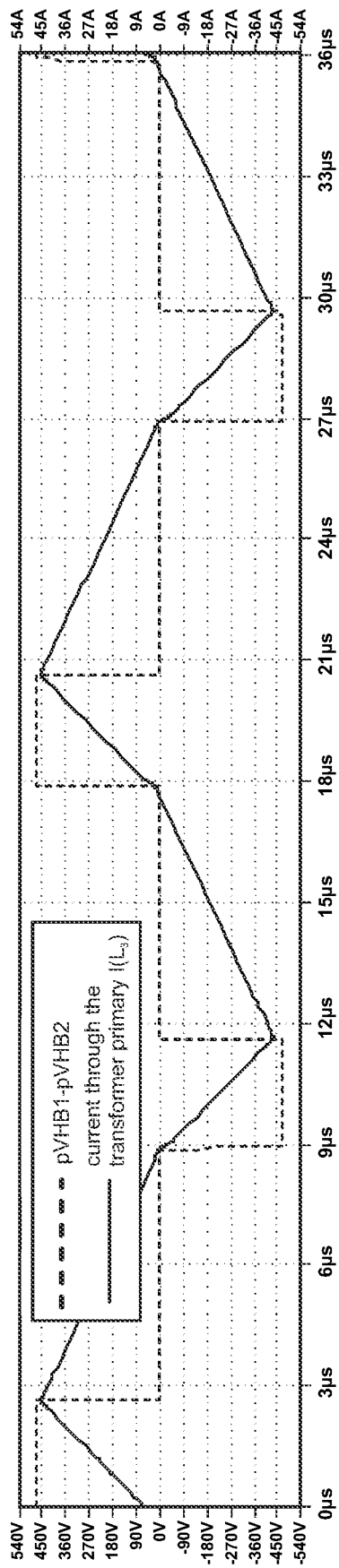
Figure 8A:
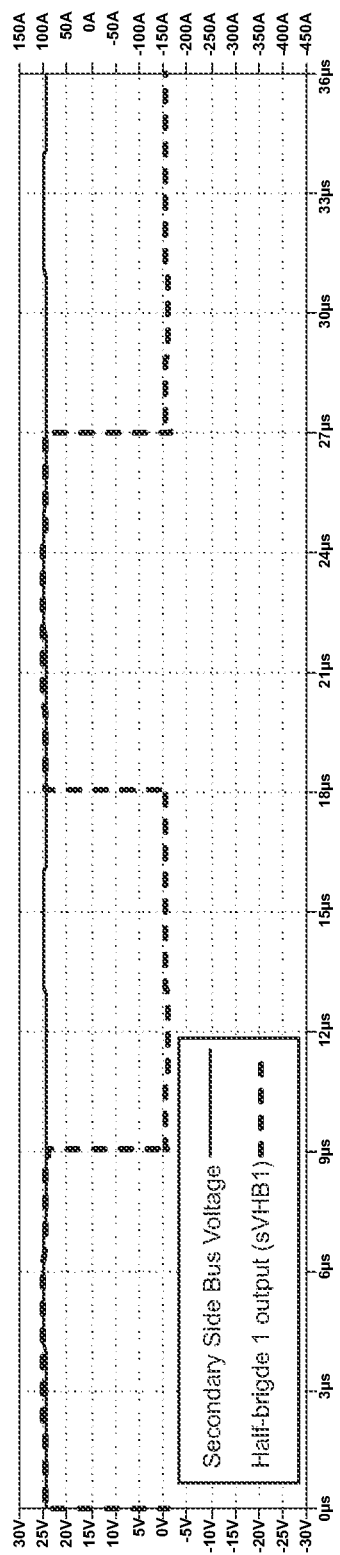
FIGS. 8A, 8B, 8C, and 8D. Secondary side waveforms for a converter that receives an input DC voltage on the primary side while outputting an output DC voltage on the secondary side: Secondary side bus voltage, half-bridge 1 output voltage ("sVHB1") and half-bridge 2 output voltage ("sVHB2"), full-bridge output voltage (sVHB1-sVHB2), and current through the transformer secondaries ($I(L_1)$ and $I(L_2)$) in FIG. 3).
Figure 8B:
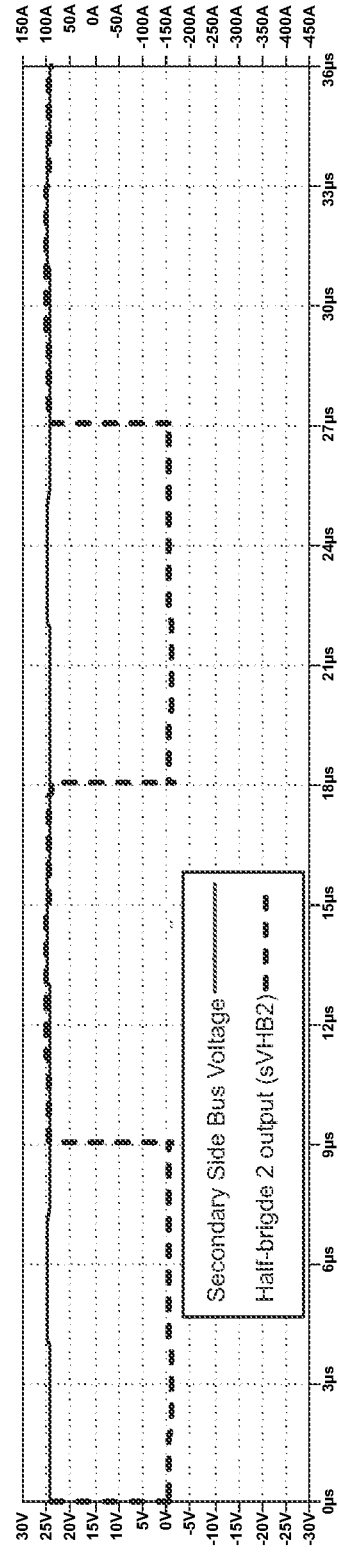
Figure 8C:
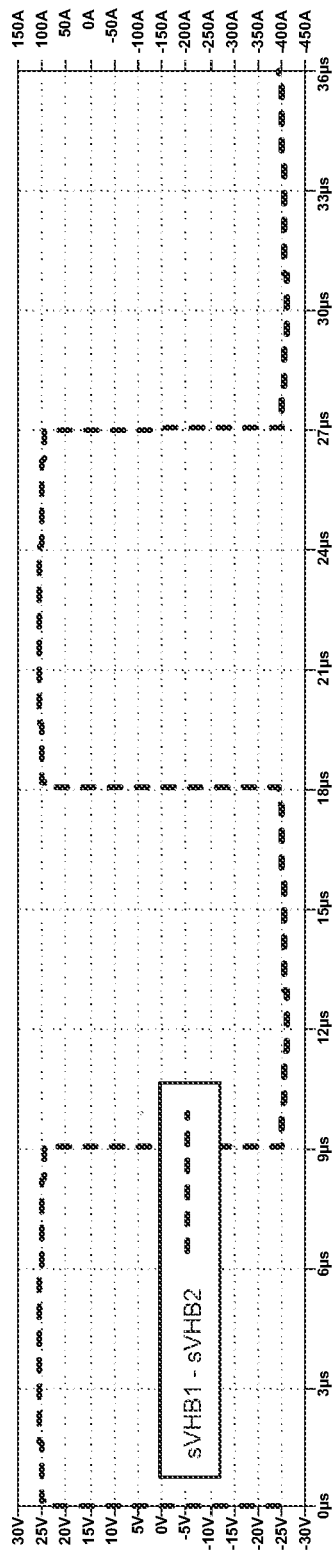
Figure 8D:
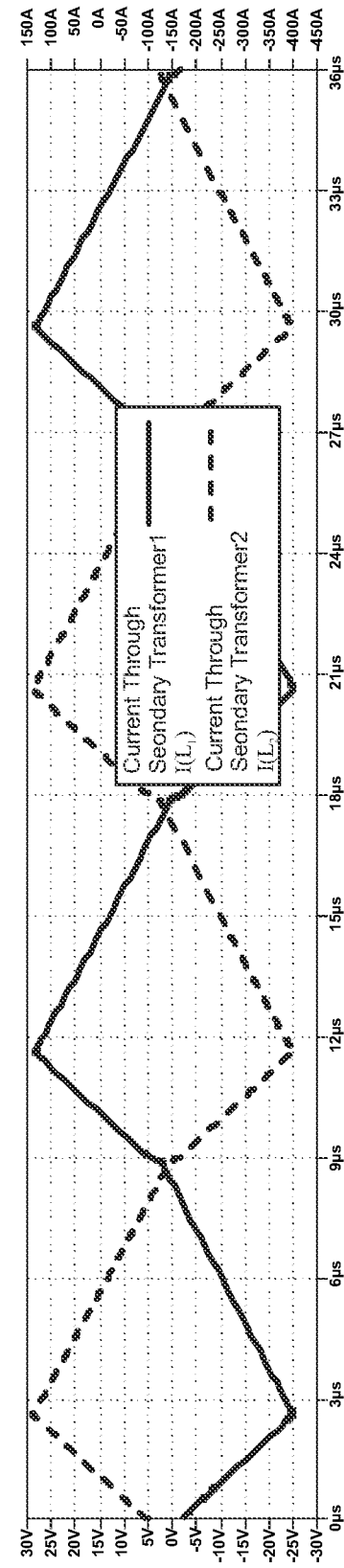

Referring to FIGS. 7 to 8, waveforms for the converter of FIG. 3 are provided in which the secondary stage 14 receives the input DC voltage and the primary stage 12 outputs the output DC voltage is provided. In particular, the input DC voltage can be a low voltage DC input (e.g., 8 volts to 16 volts or 24 volts to 58 volts), while the output voltage can be a high voltage DC output (360 volts to 920 volts). In this variation, the input DC voltage is received by the secondary stage 14 at terminal Tm of the secondary windings, the second switching network 28 operating from a second side bus voltage converts the input DC voltage into the second AC voltage. Transformer 18 converts the second AC voltage to the first AC voltage. First switching network 16 is then operated to convert the first AC voltage to the output DC voltage. FIG. 7A provides plots of the half-bridge 1 output voltage ("pVHB1"). FIG. 7B provides plots of the primary half-bridge 2 output voltage ("pVHB2"). FIG. 7C provides plots of the primary side full-bridge output voltage (pVHB1-pVHB2) and current through the transformer primary (I(L$_3$)). FIG. 8A provides plots of the secondary side bus voltage and half-bridge 1 output voltage ("sVHB1"). FIG. 8B provides plots of the secondary side bus voltage and half-bridge 2 output voltage ("sVHB2"). FIG. 8C provides plots of the full-bridge output voltage (sVHB1-sVHB2), FIG. 8D provides plots of the current through the transformer secondaries (I(L$_1$) and I(L$_2$) in FIG. 3).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bidirectional or unidirectional DC-DC converter that applies a dual active bridge rectifier topology that converts an input DC voltage to an output DC voltage, the bidirectional or unidirectional DC-DC converter comprising:

a first switching network that receives or outputs a first DC voltage and a first AC voltage, the first switching network configured to receive the first DC voltage and to convert the first DC voltage to the first AC voltage or to convert the first AC voltage to the first DC voltage and to output the first DC voltage;

a second switching network in electrical communication with a secondary side voltage bus; and a transformer having primary windings and secondary windings, the transformer configured to receive the first AC voltage and output a second AC voltage or to receive the second AC voltage and output the first AC voltage, the secondary windings having a first end terminal a second end terminal, and an output terminal positioned between the first end terminal and the second end terminal, the primary windings being in electrical communication with the first switching network, the second switching network being connected across the first end terminal and the second end terminal of the secondary windings, wherein the secondary windings and the second switching network are configured to convert the second AC voltage to a second DC voltage or to convert the second DC voltage to the second AC voltage, wherein the first switching network and the second switching network are operated such that a first current flows between the first end terminal and the output terminal of the secondary windings, a second current flows between the second end terminal and the output terminal of the secondary windings, and a third current flows through the primary windings, the first current, the second current, and third current being at least partially established by mutual inductance between the primary windings and the secondary windings such that when the first DC voltage is the input DC voltage, the second DC voltage is the output DC voltage and when the second DC voltage is the input DC voltage, the first DC voltage is the output DC voltage, wherein the first switching network is a first H-bridge circuit and the second switching network is a second H-bridge circuit, wherein the second switching network includes a first H-bridge arm that includes a first transistor switch and a second transistor switch and a second H-bridge arm that includes a third transistor switch and a fourth transistor switch, and wherein during operation, the same voltage polarity is provided to the output terminal of the transformer during a positive portion and a negative portion of each cycle of the second AC voltage.

2. The bidirectional or unidirectional DC-DC converter of claim 1, wherein the first current is approximately equal to the second current multiplied by −1 plus an offset value.

3. The bidirectional or unidirectional DC-DC converter of claim 1, wherein the first current and the second current are combined to form an output DC current.

4. The bidirectional or unidirectional DC-DC converter of claim 1, wherein the output DC voltage is less than the input DC voltage.

5. The bidirectional or unidirectional DC-DC converter of claim 1, wherein the output DC voltage is greater than the input DC voltage.

6. The bidirectional or unidirectional DC-DC converter of claim 1, wherein the output DC voltage is half a secondary bus voltage.

7. The bidirectional or unidirectional DC-DC converter of claim 1, further comprising a microcontroller configured to control the first switching network.

8. The bidirectional or unidirectional DC-DC converter of claim 7, wherein the microcontroller is further configured to control the second switching network.

9. The bidirectional or unidirectional DC-DC converter of claim 1, wherein the second AC voltage is from about 30 volts to 60 volts peak to peak.

10. The bidirectional or unidirectional DC-DC converter of claim 1, wherein the second AC voltage is about 48 volts peak to peak.

11. The bidirectional or unidirectional DC-DC converter of claim 1, wherein the input DC voltage is from about 360 volts to 920 volts.

12. The bidirectional or unidirectional DC-DC converter of claim 1, wherein the input DC voltage is about 170 volts to 470 volts.

13. The bidirectional or unidirectional DC-DC converter of claim 1, wherein the output DC voltage is from about 8 volts to about 16 volts.

14. The bidirectional or unidirectional DC-DC converter of claim 1, wherein the output DC voltage is from about 24 to 58 volts.

15. A bidirectional or unidirectional DC-DC converter that applies a dual active bridge rectifier topology that converts an input DC voltage to an output DC voltage, the bidirectional or unidirectional DC-DC converter comprising:
- a first switching network that receives or outputs a first DC voltage and a first AC voltage;
- a second switching network in electrical communication a secondary side voltage bus; and
- a transformer having primary windings and secondary windings, the secondary windings having a first end terminal, a second end terminal, and an output terminal positioned between the first end terminal and the second end terminal, the primary windings being in electrical communication with the first switching network, the second switching network being connected across the first end terminal and the second end terminal of the secondary windings, wherein the first switching network and the second switching network are operated such that a first current flows between the first end terminal and the output terminal of the secondary windings, a second current flows between the second end terminal and the output terminal of the secondary windings, and a third current flows through the primary windings, the first current, the second current, and third current being at least partially established by mutual inductance between the primary windings and the secondary windings such that when the first DC voltage is the input DC voltage, a second DC voltage is the output DC voltage and when the second DC voltage is the input DC voltage, the first DC voltage is the output DC voltage, wherein the first switching network is a first H-bridge circuit and the second switching network is a second H-bridge circuit, wherein the second switching network includes a first H-bridge arm that includes a first transistor switch and a second transistor switch and a second H-bridge arm that includes a third transistor switch and a fourth transistor switch, and wherein during operation, the same voltage polarity is provided to the output terminal of the transformer during a positive portion and a negative portion of each cycle of second AC voltage.

* * * * *